G. HAIGH.
CAR AXLE.
APPLICATION FILED DEC. 4, 1908.
925,090.
Patented June 15, 1909.
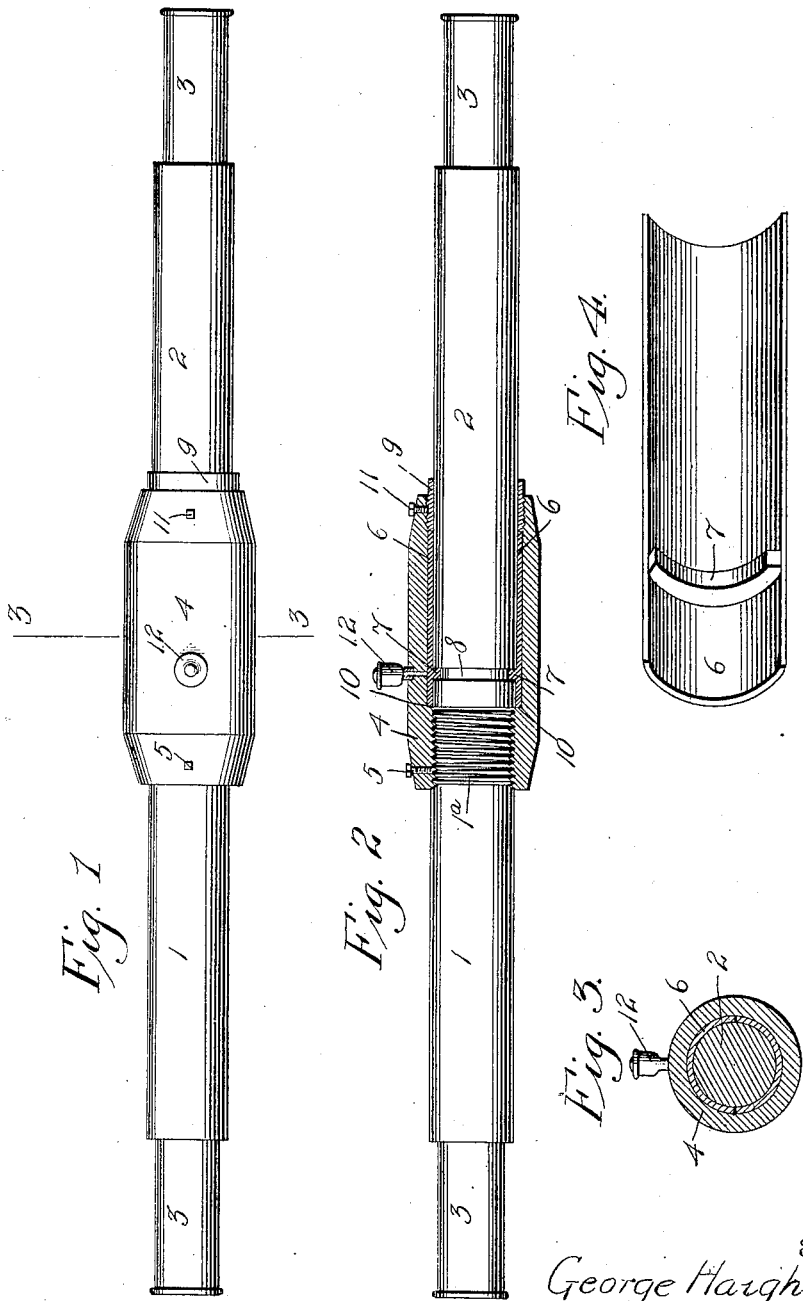
Witnesses
Albert L. Key.
M. T. Miller.
Inventor
George Haigh,
By 
Attorneys

UNITED STATES PATENT OFFICE.

GEORGE HAIGH, OF FAIRFIELD, WASHINGTON.

CAR-AXLE.

No. 925,090.   Specification of Letters Patent.   Patented June 15, 1909.

Application filed December 4, 1908. Serial No. 465,989.

*To all whom it may concern:*

Be it known that I, GEORGE HAIGH, a citizen of the United States, residing at Fairfield, in the county of Spokane, State of Washington, have invented certain new and useful Improvements in Car-Axles; and I do hereby declare the following to be a full, clear, and exact description of the invention, such as will enable others skilled in the art to which it appertains to make and use the same.

This invention relates to car axles; and has for its object to provide an axle for this purpose made in two sections axially disposed with relation to each other and joined by a swivel connection so that the wheels fixed on the outer ends of said axle may rotate independently of each other when rounding curves, thus enabling the wheel traveling on the rail having the longer radius, to rotate faster than the other wheel, thereby reducing friction between the wheels and the track to a minimum and causing a saving in power required to move the train, lessening the wear on both rails and wheels and thus lengthening their life.

With these and other objects in view, the invention consists in the novel construction, combination and arrangement of parts hereinafter described and claimed, and illustrated in the accompanying drawings, in which—

Figure 1 is an exterior view of the improved car axle. Fig. 2 is a similar view of the two-part axle with the swivel connection shown in section. Fig. 3 is a cross sectional view on the line 3—3 of Fig. 1. Fig. 4 is a perspective view of the detail of the invention.

Similar reference characters are used to indicate the same parts throughout the several views.

In the drawings, the axle is made of two parts, 1 and 2 each provided with a bearing 3 on its outer end and adapted to be rigidly connected to a wheel (not shown) in the usual manner. The axle members 1 and 2 are disposed in line with each other and have their inner ends which are flat and perpendicular to the center of rotation in close relation to each other, one of said ends, for instance that end on the axle section 1, being provided with an exterior thread $1^a$, on which is firmly secured a sleeve 4 threaded to fit the end of the axle and locked thereon against rotation by means of one or more bolts 5 screwed through the end of the sleeve and bearing firmly against the threads $1^a$ on the axle section 1. The remainder of the sleeve 4 which is preferably longer than the threaded portion is provided with a bore of greater diameter than the axle section 2 which rotates therein for the purpose of receiving bearing boxes or brasses 6, which extend from the inner end of the shaft section 1 nearly to the opposite end of the sleeve. The brasses 6 are made in two parts, each semi-circular in cross section and provided near their inner ends with a semi-circular rib 7 arranged to enter a peripheral groove 8 cut in the axle section 2, as shown in the drawing.

A collar 9 loosely encircles the shaft section 2, and is provided with an exterior thread on one end adapted to engage the threaded outer end of the sleeve 4 and bear against the ends of the brasses 6, forcing them against the shoulder 10, formed by enlarging the bore in said sleeve to fit said brasses. The friction produced on the brasses by thus clamping them between the shoulder 10 and collar 9 is sufficient to prevent said brasses from rotating in the sleeve and to prevent the latter from loosening or being unscrewed by the rotation of the axle, one or more locking bolts 11 are threaded through the adjacent end of the sleeve and bear on the threads of the collar. An oil cup 12 of any approved type is attached to the sleeve 4 for the purpose of lubricating the bearing between the axle and the brasses.

A two-part car axle, constructed as above described, is simple in construction and comprises but few parts which are strong and firmly secured together and afford a relatively long bearing for the inner end of the axle section 2, which rotates in the brasses carried by the sleeve and in the collar 9. The two axle sections are prevented from separating or having any longitudinal movement with respect to each other by the arrangement of the brasses 6, which are held firmly in the sleeve 4 by the collar 9, and they in turn, hold the section 2 by means of the ribs 7, engaging the groove 8, from longitudinal play.

What is claimed is:

1. A car axle comprising two independently rotatable alining sections, one of said sections having a circumferential groove formed in its inner end; a sleeve secured to the other section and inclosing the inner ends of both sections; and a bearing member for the first named member disposed within the bore of said sleeve and provided with a projection fitting in said groove.

2. A car axle comprising two independently rotatable alining sections, one of said sections having a circumferential groove formed in its inner end; a sleeve secured to the other section and inclosing the inner ends of both sections; and a boxing disposed within the bore of said sleeve and forming a bearing for the first named member, said boxing being provided with a projection fitting in said groove.

3. A car axle, comprising two sections in alinement with their ends in juxtaposition, a sleeve secured against rotation to one of said axle sections, a boxing in the opposite end of said sleeve to form a bearing for the inner end of the other axle section, and a collar rotatable on said latter axle section adapted to be secured in the end of the sleeve and bear against said boxing.

4. A car axle, comprising two sections in alinement with their inner ends in close relation to each other, a sleeve screwed on one of said axle sections and having an enlarged bore in its other end, a two-part boxing disposed in said bore and arranged to form a bearing for the other axle section, said boxing having an inwardly projecting rib engaging a peripheral groove in said latter axle section, and a collar rotatable on said section adapted to be screwed into the end of the sleeve and against the end of the boxing.

5. A car axle, comprising two sections in alinement with their inner ends being in close relation to each other, a sleeve threading on the end of one of said axle sections and having its opposite end bored out to a greater diameter than the axle, brasses adapted to be inserted in said enlarged bore and having inwardly projecting ribs fitting a circumferential groove in the other axle section, a collar rotatable on said axle section screwed into the outer threaded end of the sleeve and clamping said boxes firmly therein, and bolts threaded through the ends of the sleeve for locking the axle section threaded thereinto and the collar against rotation with respect to said sleeve.

In testimony whereof, I affix my signature, in presence of two witnesses.

GEORGE HAIGH.

Witnesses:
 WALTER LIVERMORE,
 THOMAS JARRARD.